July 21, 1964
A. E. HART
3,141,529
POWER OPERATED TRAILER BRAKE SYSTEM
Filed May 16, 1962
2 Sheets-Sheet 1
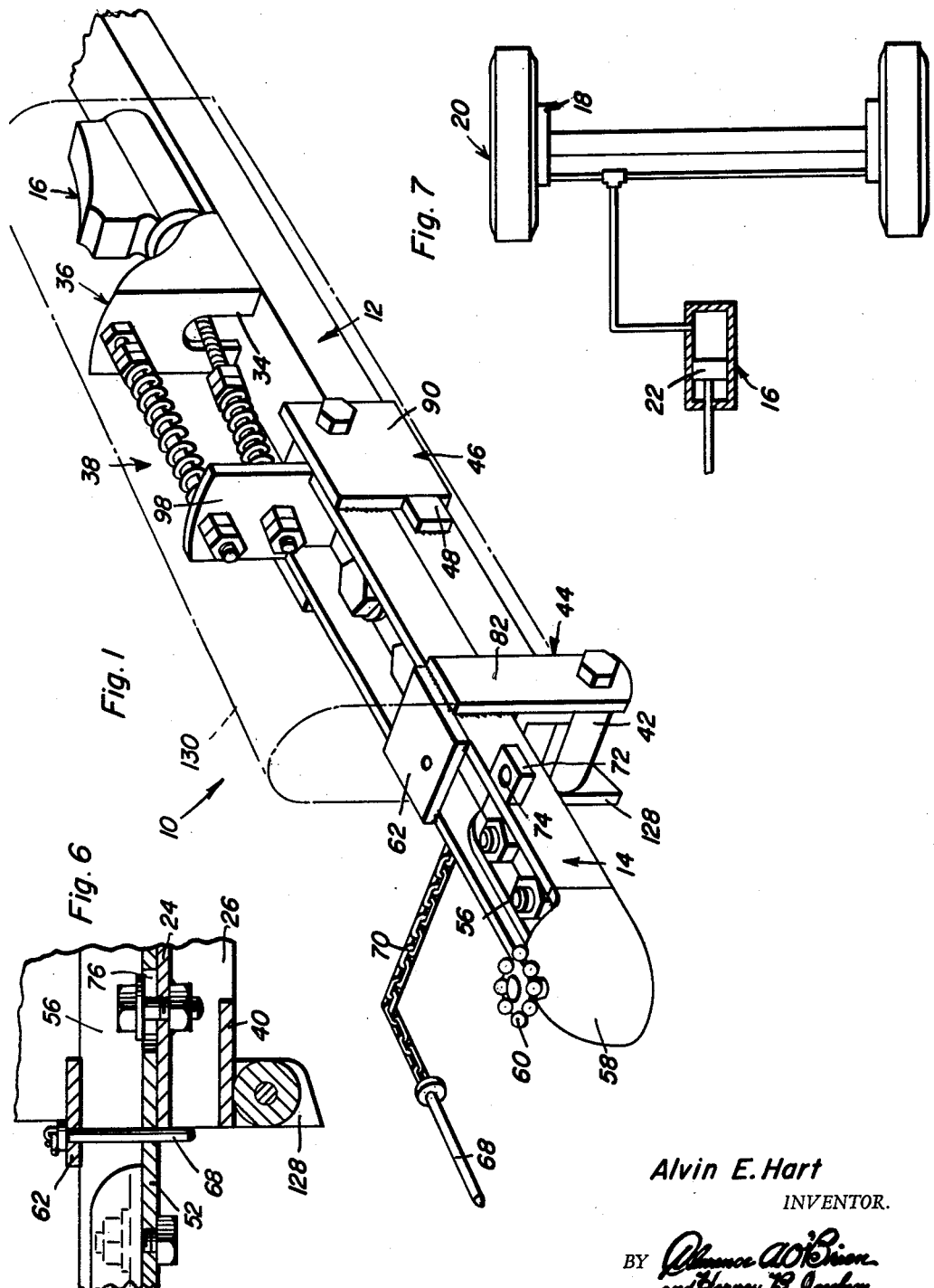
Alvin E. Hart
INVENTOR.

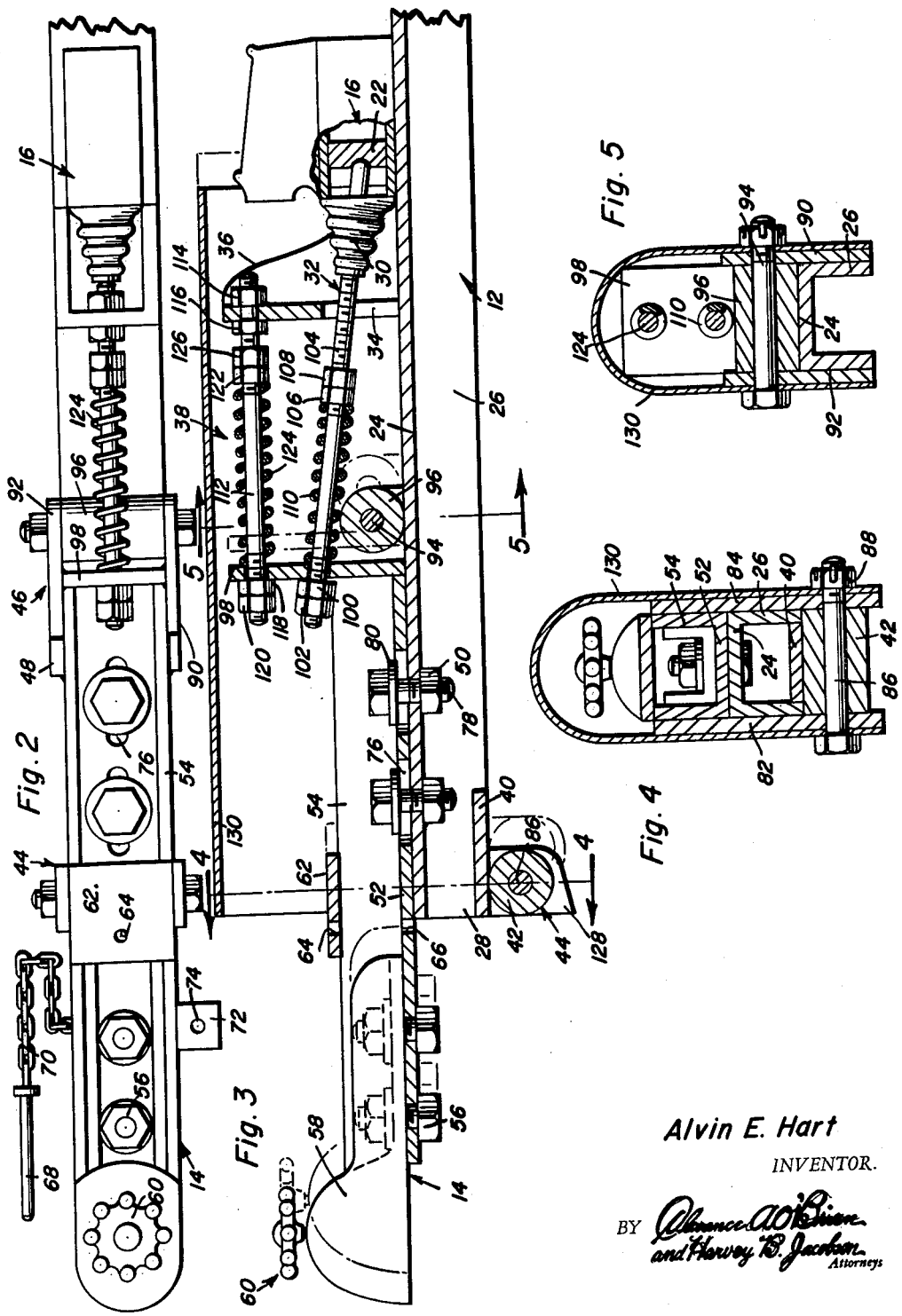

United States Patent Office 3,141,529
Patented July 21, 1964

3,141,529
POWER OPERATED TRAILER BRAKE SYSTEM
Alvin E. Hart, 4228 Browne St., Omaha, Nebr., assignor of ten percent to Edythe E. Jewell, and ten percent to Zifford E. Robbins, both of Omaha, Nebr.
Filed May 16, 1962, Ser. No. 195,092
4 Claims. (Cl. 188—112)

This invention relates to a new and useful braking system for towed vehicles or trailers.

The present invention is concerned with a trailer brake applying system that automatically responds to relative acceleration and deceleration between the towing vehicle and the trailer for applying the trailer brakes so as to avoid damage to or disconnection of the trailer hitch by means of which the trailer is connected to the towing vehicle. It will be appreciated that the hitch connection between a trailer and a towing vehicle may be subjected to excessive loads as a result of the aforementioned acceleration and deceleration that occurs when either the towing vehicle slows down or stops abruptly or when the speed of the trailer increases abruptly with respect to the towing vehicle on a downgrade for example. Braking systems for trailers that are automatically operative in response to such accelerations and decelerations between the towing vehicle and the trailer have heretofore been devised but do not embody those features of the present invention that render it more widely available because of the ease with which the brake applying system may be installed on the trailer tongue of any trailer and because of the unexpected economy of manufacture and durability of the brake applying system.

Another important object of the present invention is to provide an automatic brake applying system which may be adjusted for varying the conditions under which the trailer brakes are applied.

A further object of the present invention is to provide an automatic brake applying system for trailer brakes featuring means for automatically applying the brakes in response to disconnection of the trailer and hitch from the towing vehicle.

In accordance with the foregoing objects, the brake applying system of the present invention involves the rigid mounting of a hydraulic master cylinder on the trailer tongue and a spring support bracket for a spring type surge control interconnected with a hitch beam slidably mounted on the trailer tongue, the hitch beam also being connected to the master cylinder piston through a yieldable connecting device. Guide structure carried by the hitch beam in embracing relation to the trailer tongue is also provided with a protective shield which extends rearwardly for protection of the surge control device and yieldable connecting device aforementioned. The yieldable connecting device will respond to a predetermined displacement of the hitch beam relative to the trailer tongue for applying the brakes on the traction wheels of the trailer through the hydraulic master cylinder, the surge control device insuring that the predetermined displacement necessary for applying the brakes will only occur in response to accelerating or decelerating forces in excess of a minimum value so as to avoid undesired braking of the trailer vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the components forming the brake applying system of the present invention.

FIGURE 2 is a top plan view of the arrangement shown in FIGURE 1.

FIGURE 3 is a side longitudinal sectional view of the arrangement shown in FIGURES 1 and 2.

FIGURE 4 is a transverse sectional view taken substantially through a plane indicated by section line 4—4 in FIGURE 3.

FIGURE 5 is a sectional view taken substantially through a plane indicated by section line 5—5 in FIGURE 3.

FIGURE 6 is a partial sectional view showing the device conditioned for backing up the trailer by the towing vehicle.

FIGURE 7 is a diagrammatic view of the trailer brake arrangement adapted to be applied by the brake applying system of the present invention.

Referring now to the drawing in detail, it will be observed from FIGURE 1, that the parts of the brake applying system generally referred to by reference numeral 10 are mounted on a trailer tongue generally referred to by reference numeral 12 which projects forwardly from the trailer, the trailer tongue being connected to the towing vehicle by means of a hitch beam generally referred to by reference numeral 14. The hitch beam 14 is slidably mounted on the trailer tongue 12 so that relative displacement of the hitch beam 14 in a rearward direction with respect to the trailer tongue, will displace the piston within a hydraulic master cylinder generally referred to by reference numeral 16. The master cylinder 16 is therefore hydraulically connected to the brake cylinders associated with the brake mechanisms 18 on the trailer vehicle wheels 20 as diagrammatically illustrated in FIGURE 7. Thus, should excessive accelerating or decelerating forces exist between the towing vehicle and the trailer, the aforementioned rearward slidable displacement of the hitch beam 14 on the trailer tongue 12 will occur so as to cause displacement of the piston 22 in a rearward direction in the master cylinder 16, pressurizing the brake fluid for applying the brakes 18.

Referring now to FIGURES 2 and 3 in particular, it will be observed that the trailer tongue 12 is in the form of a channel member having a top portion 24 connected to downwardly opening side portions 26. The master cylinder 16 is fixedly mounted on the top portion 24 rearwardly spaced from a forward end 28 of the trailer tongue. A flexible seal 30 is mounted on the forward end of the master cylinder 16 through which the piston rod 32 extends, the piston rod being pivotally displaceable with respect to the piston 22. The piston rod extends through a slot 34 formed in a spring mounting bracket member 36 that is rigidly secured to the top portion 24 of the trailer tongue. The bracket member 36 therefore supports in spaced relation above the piston rod 32 that extends therethrough, a surge control device generally referred to by reference numeral 38. A bottom support plate member 40 interconnects the side portions 26 of the trailer tongue adjacent the forward end 28 thereof and is in bearing contact with the roller element 42 of a guide bracket assembly generally referred to by reference numeral 44 which is fixedly mounted on the hitch beam 14 in spaced relation forwardly of a rear guide bracket assembly 46 which is also connected to the hitch beam 14. In order to limit forward movement of the hitch beam 14 relative to the trailer tongue 12, a pair of limit stop blocks 48 are welded to the side portions 26 of the trailer tongue 12 for abutment with the rear guide bracket assembly 46 on the hitch beam 14. Finally, the trailer tongue 12 is provided with a pair of spaced nut elements 50 adjacent the forward end 28 thereof, said nut elements being welded to the underside of the top portion 24 of the trailer tongue for purposes to be hereafter explained.

The hitch beam 14 is also constituted by an upwardly opening channel member including a bottom portion 52 in sliding contact with the top portion 24 of the trailer tongue and side portions 54. Connected to the hitch beam adjacent the forward end thereof, by means of a pair of screw and nut fastener assemblies 56, is the hitch socket member 58 provided with a hitch locking device 60. The hitch beam 14 is thereby connected to the hitch connecting structure mounted on the towing vehicle in a manner well known to those skilled in the art. Welded between the side portions 54 of the hitch beam, intermediate the forward and rear ends thereof, is a plate member 62 having an aperture 64 aligned with the aperture 66 in the bottom portion 52 of the hitch beam, said apertures 64 and 66 adapted to receive a drop pin 68 connected to one side portion 54 of the hitch beam by means of the chain 70. When inserted through the apertures 64 and 66, the drop pin 68 will be effective to prevent rearward displacement of the hitch beam 14 relative to the trailer tongue so as to avoid applying the brakes when it is desired to back the trailer up by means of the towing vehicle. When not in use, the drop pin 68 may be supported by the projecting member 72 connected to that side portion 54 of the hitch beam opposite from the chain 70, having an aperture 74 therein for receiving the drop pin. A pair of slots 76 are also provided in the bottom portion 52 of the hitch beam through which threaded screw elements 78 extend for threaded engagement with the nut elements 50 welded to the underside of the top portion 24 of the trailer tongue. Washer elements 80 are disposed between the head portions of the screw elements 78 and the bottom portion 52 of the hitch beam. Slidable movement of the hitch beam 14 will therefore be limited as well as guided by relative movement between the screw elements 78 fixed to the trailer tongue and the hitch beam since said screw elements extend through the slots 76. However, lateral bending of the hitch beam 14 will be resisted by means of the guide bracket assemblies 44 and 46 fixed thereto and disposed in embracing relation to the trailer tongue 12.

The guide assembly 44 includes a pair of vertical side members 82 and 84 which are welded or otherwise fastened to the side portions 54 of the hitch beam and extend downwardly therefrom on the outside of the side portions 26 of the trailer tongue as more clearly seen in FIGURES 3 and 4. Interconnecting the lower end portions of the side members 82 and 84, is a headed bolt member 86 having a threaded end portion on which a cotter pin locknut 88 is received in order to maintain the guide assembly 44 in proper assembled condition. Rotatably mounted on the bolt 86 is the bearing roller element 42 contacting the bottom plate member 40 as hereinbefore indicated. The guide assembly 46 is also provided with a pair of side members 90 and 92 which are interconnected by a bolt assembly 94 similar to the bolt 86 but disposed above the top portion 24 of the trailer tongue so as to rotatably mount a bearing roller element 96 in contact with the trailer tongue on the upper side thereof. Accordingly, the hitch beam 14 will be slidably mounted on the trailer tongue with the bearing rollers 42 and 96 resisting lateral bending thereof in a vertical direction. Welded to the end of the hitch beam and extending between the side plate members 90 and 92 of the guide assembly 46, is an upwardly projecting connecting plate member 98. The plate member 98 supports thereon both the piston rod member 32 and the surge control device 38 in vertically spaced relation thereabove.

The piston rod member 32 is received through an aperture in the plate member 98 for support thereof in an inclined position. The piston rod member 32 is provided with a threaded portion adjacent the forward end thereof for threadedly receiving an adjusting nut 100 and a locknut 102. Adjustably mounted on the spaced threaded portion 104 of the piston rod member 32, is a second adjusting nut 106 held in adjusted position by the locknut element 108. Disposed on the piston member 32 and reacting between the plate member 98 and the nut element 106, is a yieldable brake actuating element in the form of an elastically deformable force transmitting spring 110. It will be apparent therefore, that the spring element 110 will be axially displaced by a certain amount in response to rearward displacement of the hitch beam and connecting plate 98 as shown by dotted lines in FIGURE 3 until the displacement forces transmitted through the spring will be sufficient to cause displacement of the piston 22 within the master cylinder 16. The point at which the piston 22 will be displaced by displacing forces may thereby be regulated by varying the initial compression of the spring 110 through axial adjustment of the nut elements 106 and 108. Therefore, it will be apparent that the amount of displacement of the hitch beam and connecting plate 98 necessary to cause actuation of the brakes may be varied. For any particular setting of the nut elements 106 and 108, regulating the brake actuating displacement necessary, the surge control device 38 will be available for regulating the displacing force necessary to cause displacement of the hitch beam as well as the rate of said displacement necessary to cause the brakes to be applied. The surge control device 38 therefore includes a spring supporting member 112 having threaded end portions so that it may be fixedly mounted on the bracket member 36 by means of the nut elements 114 and 116. Adjusting nut 118 and locknut 120 are therefore threadedly received in adjustable position on the other threaded end of the mounting member 112 for limiting the forward position of the plate member through which the mounting member 112 loosely extends. Reacting between the plate member 98 and the adjusting nut 122 is the control spring 124 the compression of which may be varied by axial adjustment of the adjusting nut 122 held in axially adjusted position by means of the locknut 126. Accordingly, the displacing force necessary to cause the aforementioned predetermined displacement of the hitch beam for brake applying purposes, may be regulated.

It will be observed that one of the side plate members 84 of the guide bracket 44, is provided with a forwardly projecting ground engaging portion 128. This ground engaging projection is provided for the purpose of causing engagement of the trailer brakes should the trailer become disconnected from the towing vehicle when the towing vehicle is in motion. It will be appreciated that when the towing vehicle is in motion imparting thereby motion to the trailer, upon disconnection of the trailer, the forward end of the trailer tongue 12 will drop to the ground whereupon the projection 128 engages the ground in order to abruptly decelerate the forward motion of the hitch beam 14 whereupon displacement of the hitch beam with respect to the trailer tongue occurs so as to apply the brakes.

The brake applying assembly also includes a protective shield member 130 which may be fastened to the sides of the guide assemblies 44 and 46 for movement with the hitch beam, the shield member extending rearwardly therefrom in protective relation to the spring elements 110 and 124 in all positions thereof. Protection is thereby afforded for both the spring elements and the sliding contact portions of the hitch beam and the trailer tongue.

From the foregoing description, the operation and utility of the brake applying system of the present invention will be apparent. It will therefore be appreciated, that installation of the brake applying system is greatly facilitated by virtue of the mounting of the guide structure including the assemblies 44 and 46 on the hitch beam itself for establishing the yieldable connection to the piston of the master cylinder 16 and for cooperation with the surge control device 38 disposed between the connecting plate 98 and the bracket 36 in order to regulate the accelerating or decelerating displacing force to which the brake actuating mechanism responds. Facilities are also provided for enabling backing up of the trailer as indicated in FIGURE 6 so as to prevent application of the trailer brakes. Also, provision is made for automatic application of the brakes upon disconnection of the trailer from the towing vehicle when in motion as herein before described in connection with the provision of the ground engaging projection 128 on the guide assembly 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a towing vehicle having a disconnectible coupling element and a trailer having hydraulic brakes, a first hitch member of channel section shape with open side up and having a front end carrying a coupling member mating said coupling element of the towing vehicle, said trailer having at its forward end, a second channel section shaped member with its open side disposed downwardly, vertically extending longitudinally spaced side members secured to the outer sides of said channel-section shaped members, said first hitch member having an upwardly extending projection at its rear end a housing mounted on said first hitch member for movement therewith between limits defined by said side members, a spring type shock absorber operatively mounted within said housing, said shock absorber having one end fixedly mounted on said second channel section shaped member spaced from the front end thereof and having its other end connected to said upwardly extending projection at a point spaced from both channel-section shaped members, a master brake cylinder secured to said second channel-section shaped member and having a hydraulic fluid line connection with said brakes, a piston operatively mounted in said cylinder, a push rod socketed in the forward end of the piston, said push rod extending through an opening in said upwardly extending projection below the shock absorber, and a spring mounted on said push rod and reacting against said upwardly extending projection for transferring force from the first hitch member to the piston after a predetermined displacement of the shock absorber by such force.

2. In combination with a towing vehicle having a disconnectible coupling and a trailer having fluid actuated brakes, a hitch member connectible to said coupling, a trailer tongue connected to said trailer and slidably mounting said hitch member, longitudinally spaced guide rollers rotatably mounted by the hitch member for engagement with the trailer tongue on opposite longitudinal sides thereof, a spring bracket member secured to one side of said tongue, a brake actuating device mounted on the tongue rearwardly of the bracket member and having a piston rod projecting through said bracket member, a plate member secured to the hitch member in spaced adjacency to one of the guide rollers and having an opening through which said piston rod extends, yieldable force transmitting means mounted on said piston rod and reacting against the plate member for yieldably transmitting force in one direction to apply said brakes, surge control means mounted between said bracket and plate member above the piston rod for resisting movement of the plate member in said one direction toward the bracket member, a housing element mounted on the hitch member for movement therewith enclosing the plate and bracket members therein, and means mounted on the piston rod and the surge control means for engagement with the plate member to limit relative movement between the plate and bracket members in a direction opposite to said one direction.

3. The combination of claim 2, wherein said surge control means comprises, spring mounting means operatively connected between said plate member and the trailer tongue and adjustable bias spring means mounted on the spring mounting means for biasing the hitch member in a forward direction relative to the trailer tongue.

4. The combination of claim 2 including ground engaging means mounted on said hitch member for deceleration thereof to effect application of the brakes in response to disconnection of the hitch member from the towing vehicle that is in motion.

References Cited in the file of this patent

UNITED STATES PATENTS

| 1,896,427 | Selvester | Feb. 7, 1933 |
| 1,902,819 | Arato | Mar. 28, 1933 |
| 2,048,788 | Falknor | July 28, 1936 |
| 2,101,600 | Sandul | Dec. 7, 1937 |
| 2,125,702 | Watson | Aug. 2, 1938 |
| 2,133,195 | Howard | Oct. 11, 1938 |
| 2,138,267 | Christenson | Nov. 29, 1938 |
| 2,233,994 | Cook | Mar. 4, 1941 |
| 2,320,585 | Gill | June 1, 1943 |
| 2,476,003 | Symmonds | July 12, 1949 |
| 2,642,961 | Teal | June 23, 1953 |
| 2,672,221 | Laudahl | Mar. 16, 1954 |
| 2,729,309 | Mullin | Jan. 3, 1956 |
| 2,916,107 | Huentelman | Dec. 8, 1959 |
| 2,954,104 | Shumate | Sept. 27, 1960 |
| 3,007,552 | Eksergian | Nov. 7, 1961 |

FOREIGN PATENTS

| 519,088 | Canada | Dec. 6, 1955 |